US012801704B2

(12) United States Patent
Ojomo

(10) Patent No.: US 12,801,704 B2
(45) Date of Patent: Nov. 17, 2026

(54) OBFUSCATED AND SECURED COMPUTER-EXECUTABLE SOURCE CODE

(71) Applicant: Michael Ojomo, Modesto, CA (US)

(72) Inventor: Michael Ojomo, Modesto, CA (US)

( * ) Notice: Subject to any disclaimer, the term of this patent is extended or adjusted under 35 U.S.C. 154(b) by 0 days.

(21) Appl. No.: 17/485,393

(22) Filed: Sep. 25, 2021

(65) Prior Publication Data

US 2023/0096677 A1 Mar. 30, 2023

(51) Int. Cl.

*G06F 21/14* (2013.01)
*G06F 8/73* (2018.01)
*G06F 21/54* (2013.01)
*G06F 21/64* (2013.01)

(52) U.S. Cl.

CPC ................ *G06F 21/14* (2013.01); *G06F 8/73* (2013.01); *G06F 21/54* (2013.01); *G06F 21/64* (2013.01)

(58) Field of Classification Search

CPC . G06F 21/14; G06F 8/73; G06F 21/54; G06F 21/64

See application file for complete search history.

(56) References Cited

U.S. PATENT DOCUMENTS

| | | | |
|---|---|---|---|
| 7,065,652 | B1 | 6/2006 | Xu et al. |
| 8,533,826 | B2 | 9/2013 | Desclaux |
| 8,935,681 | B2 | 1/2015 | Mersh |
| 9,183,360 | B1 | 11/2015 | Wendling |
| 9,471,288 | B2 | 10/2016 | Miller et al. |
| 9,836,612 | B2 | 12/2017 | Li |
| 10,586,026 | B2 | 3/2020 | Zvenigorodsky |

FOREIGN PATENT DOCUMENTS

| | | | | |
|---|---|---|---|---|
| EP | 3270310 A1 * | 1/2018 | ........... | G06F 21/125 |
| WO | WO-2020188546 A1 * | 9/2020 | ............. | G06F 21/52 |

OTHER PUBLICATIONS

Chang et al., Protecting Software Code by Guards, 2002. (Year: 2002).*
Ahmadvand et al., VirtSC: Combining Virtualization Obfuscation with Self-Checksumming, 2019. (Year: 2019).*
Horne et al., Dynamic Self-Checking Techniques for Improved Tamper Resistance, 2002. (Year: 2002).*

* cited by examiner

*Primary Examiner* — Trong H Nguyen
(74) *Attorney, Agent, or Firm* — Edison Law Group PLLC

(57) ABSTRACT

An obfuscated and secured computer-executable source code and a method for providing such a code is provided. Plain text source code is obfuscated and secured so that it is protected and it is more difficult to manipulate and copy it.

18 Claims, 3 Drawing Sheets

OBFUSCATED AND SECURED COMPUTER-EXECUTABLE SOURCE CODE

FIELD OF THE INVENTION

The invention relates to the protection of source code, providing obfuscated and secure source code, methods for obfuscating and securing source code, and methods for using such.

BACKGROUND OF THE INVENTION

Source code (including scripts) for computer-executable programs and functions are often hacked, intruded upon or otherwise manipulated or copied for malicious reasons or otherwise. Several current attempts to protect source code require users to install extra packages and/or modules to their systems before the protected code can be executed. Other disadvantages include that such systems only work with one programming language, and not a variety of languages, and that many methods do not use common, preexisting features and functions of the programming languages. Because of these problems, source code can be difficult to fairly and effectively license given the security and management difficulties of the past and the inability to control or manage copying, numbers of users, expiration dates and other aspects of licensing.

New obfuscated and secure source code, methods for obfuscating and securing source code, and using such, are needed.

SUMMARY OF THE INVENTION

Protected computer-executable source code is provided by embodiments of this invention. Methods of obfuscating and securing source code are also provided by embodiments of this invention. One of skill in the art will recognize that this invention can be applied to protect various source codes that are used, including source code written in programming languages such as shell, perl, python, php, ruby, Rcode, powershell, javascript and others.

In preferred embodiments, this invention can be applied to convert plain text code, which is susceptible to malicious abuse, into unreadable, obfuscated code that cannot be readily modified. In preferred embodiments, if someone modifies the code, these embodiments will cause the code to malfunction, helping to ensure that any ill-intentioned user cannot get the benefit of the plain text code.

In certain embodiments, this invention obfuscates a source code that is still understandable to, and executable by, the programming language of the interpreter it is written for, using the programming language itself to protect the code it runs. In these embodiments, encoded barriers are put in place between the running protected code and the actual hidden plain text version of the code being delivered to the interpreter for execution. These encoded barriers appear as code to any observer of the protected code. The logic behind these encoded barriers is deliberately convoluted and it does not follow an easily traceable path. In the most preferred embodiments, the same critical variables in the code are defined several times and are reused several times, each time with different apparent values assigned to them.

In certain embodiments of this invention, plain text code is taken from the user. The plain text code is converted into simple encoded text (e.g., using base64). Because base64 text and text from similar functions is easily decoded by users, in these embodiments, the letters of the output of base64 are reassigned to different values (for example, the letter "A" can be converted to the character "[", the letter "a" can be turned into a colon ":" and the letter "T" can be changed to "K", and so on).

In these embodiments, the body of the obfuscated code is then built. Identifiers are placed in different parts of the obfuscated code. These identifiers will be retrieved in the places that the operator expects (or sets) to be in as long as the obfuscated code is not tampered with. For example, letter "b" is the 2nd letter in the lowercase alphabet table. So, since all obfuscated code is deliberately limited to 2 or 3 lines (e.g., two very long lines), when an obfuscated code is executed, it will self-read itself and count how many lines are present in it, and it will use that number of lines to grab the number corresponding to a desired letter in the alphabet table. If the desired letter at the point of execution is "b", then the number of lines of the obfuscated code will be used to grab the second element from the alphabet table. Something like getvalue[1]. In most programming languages, for example, the numbers start at 0. So 0 means first value and 1 means second value.

In these embodiments, when an obfuscated code is run, it uses various known characteristics of the code to navigate the code to successful completion. These "characteristics" will change if the protected code is tampered with. For example, if the protected code is expected to have 19484 characters, when it is executed and self-reads itself, it will verify this. It will count the number of characters it has at run time, and it will divide that number by the number stored in the obfuscated code. For example, when you divide 19484/19484, you get an integer. If you divide 19484 with a number other than 19484 (e.g., because someone tampered with the obfuscated code and its character count either increased or decreased), the answer will not be 1, and, hence, when the obfuscated code goes to grab item 1 from a list, it will grab the wrong value, which then ensures the code malfunctions.

In these embodiments, barriers are created comprised of a thick layer of code. This code is designed to only unwrap the hidden plain text code and deliver it to the system's interpreter (e.g., python interpreter, ruby, javascript, php, etc.), if it does not sense any malicious intent from the user.

The most preferred embodiments of this invention use embodiments of a traffic controller (e.g., embodiments of traffic controller code, embodiments of Traffic Controller Code Module, which are referred to herein as embodiments). The most preferred embodiments of the traffic controller (e.g., stored in a second named variable) are part of the obfuscated code. It is encoded. It gets decoded to raw code only during a valid/non-intrusive execution of the obfuscated code. During a valid non-intrusive execution of the obfuscated code, the traffic controller knows which part of the obfuscated code to look at to successfully execute the obfuscated code. It scans or self-reads itself and searches to find each of the pieces of the puzzle needed to determine the next path forward. It uses pre-recorded/pre-known numerical attributes of the obfuscated code to navigate its way around the scanned obfuscated code. These numerical attributes are generated at the time the code was obfuscated by embodiments of this invention: in the most preferred embodiments these include (a) the number of lines in the obfuscated code, (b) the number of characters in the obfuscated code, and/or (c) the name of the obfuscated code at the time of obfuscation.

In the most preferred embodiments of this invention, the system can read the protected code after it has been obfuscated. The protected, obfuscated code remains an executable code, recognizable by the interpreter it was written for (e.g., python, ruby, perl, etc.). The obfuscated code uses the code of the traffic controller to reassemble all the deliberately misarranged pieces of data stored in the first named variable, in certain embodiments, for example. When a plain text code is converted into an obfuscated form, the obfuscated form, to which the plain code was transmuted, is still a functional real code. So for instance, if a python code is obfuscated, even in its obfuscated form, the code still remains a python code, albeit a very hard to comprehend python code to the naked eye. Therefore, when a user runs an obfuscated python code, the python interpreter is still going to run the code as long as it is valid python code. The principal difference is that there are barriers placed the moment a user runs a protected code between the user and the actual protected code being delivered to the python interpreter for execution. In other words, instead of the python interpreter running the code directly, as it would have had it not been obfuscated, it instead goes through a re-assembly process. This re-assembly process is programmed to run only under specific conditions.

For instance, one of the things a hacker will attempt to do to try to understand the obfuscated code is to break it apart into several lines. Now, the re-assembly process is well aware that any code obfuscated by the obfuscation tools of embodiments of this invention will have no more than 2 or 3 lines. The numbers "2" or "3" are used to signify which item from a list to grab. So if a hacker were to change a two line obfuscated code into say 100 lines for readability, that alone causes the hacker's efforts to fail, which means the protected code will not be unveiled, which then means that nothing will be delivered to the python interpreter to run. This is because, when the re-assembly process goes to do its operations, and it runs a line of code similar to "getvalue=mylist[numberOfLinesInObfuscatedCode]", the value for "numberOfLinesInObfuscatedCode" will be 100 instead of 2 or 3. And since there are not 100 items in the list, this line of code returns nothing, or it errors out.

In the most preferred embodiments, fitting everything into two lines requires simply replacing all new line characters with the semicolon ";" character. The semicolon is commonly recognized as the character to use to separate lines of code. So, a 6 line code like the one below:

```
#/usr/bin/env python
import sys,os,time
oldtime=1626933646
currtime=time.time( )
Elapsed=int(currtime)−int(oldtime)
print(elapsed)
```

Which can be converted to:

```
#!/usr/bin/env python
import sys,os,time; oldtime=1626933646; currtime=time.time( ); Elapsed=int(currtime)−int(oldtime); print(elapsed)
```

This allows the operator to pack many lines of code into one line. Other programming languages may require different methods concerning such lines, which will be apparent to a person of skill in the art.

A malicious intent can be considered to be when a user tries to duplicate the obfuscated code and gives it different name, hoping to use the protected code under that new name. This is prohibited by certain embodiments of this invention. Once a code is encrypted using these embodiments of this invention, the name it was given at the time of protection is the name it will be forever. If it is given a different name, it will not function under that name until the name is changed back.

In certain embodiments of this invention, the obfuscated code is configured to self-read itself to ensure its content has not been tampered with. Another one of the first things a curious outsider (e.g., a malicious copier) might do to try to figure out how the obfuscated code works, is to alter its content—i.e., add text or remove text. If a user does that, certain embodiments of this invention have a logic built into the obfuscated code that will detect this and cause the operation of the obfuscated code to malfunction, ensuring such a user does not get the benefits of the plain text code.

Under these two scenarios of malicious intent described above (i.e., name change, and content change), when they are detected, in certain embodiments of this invention, not only does the code malfunction, but the embodiments can also be configured to send out a signal over the internet to external servers logging the hack attempt. These attempts can be recorded and a monitoring page can be provided to see how often source codes are being attacked.

In the most preferred embodiments, the writer of the source code can use the invention to protect their code. After the invention is applied to provide an obfuscated and secure version of the code, the writer of the code can share the obfuscated and secure version with others, and the writer can have increased confidence that the users will only be able to run the code (i.e., execute the code) but will be unable to unravel it to figure out how it is doing what it does or otherwise see the plain text code. These most preferred embodiments encode a plain text code and allow it to be decoded only if it is run by a non-human, i.e., the interpreter (such as phython, php, ruby, etc.), and it guards the plain text version of the protected code so that human eyes cannot access it.

It is an object of this invention to provide protected source code that does not require the use of extra packages or modules on a user's system to be able to execute and use the code. Preferred embodiments of this invention can protect source code without requiring such extra packages or modules.

It is another object of this invention to provide protected source code that works with a variety of languages. Preferred embodiments of this invention can protect source code in a variety of programming languages and not just one.

It is another object of this invention to provide protected source code that works with the native capabilities of existing programming languages. Preferred embodiments of this invention can protect source code using modules, features and functions (e.g., base64, openssl) already provided for by a variety of programming languages.

It is another object of this invention to provide opportunities to improve the protection and licensing of source code by providing protections such as time limitations and expiration dates, user limitations, protections against copying, and provisions for providing notifications if hacking and/or other manipulations are attempted.

These and other objects of the invention can be obtained by following the teaching provided herein.

DETAILED DESCRIPTION OF THE INVENTION

Figure 1:
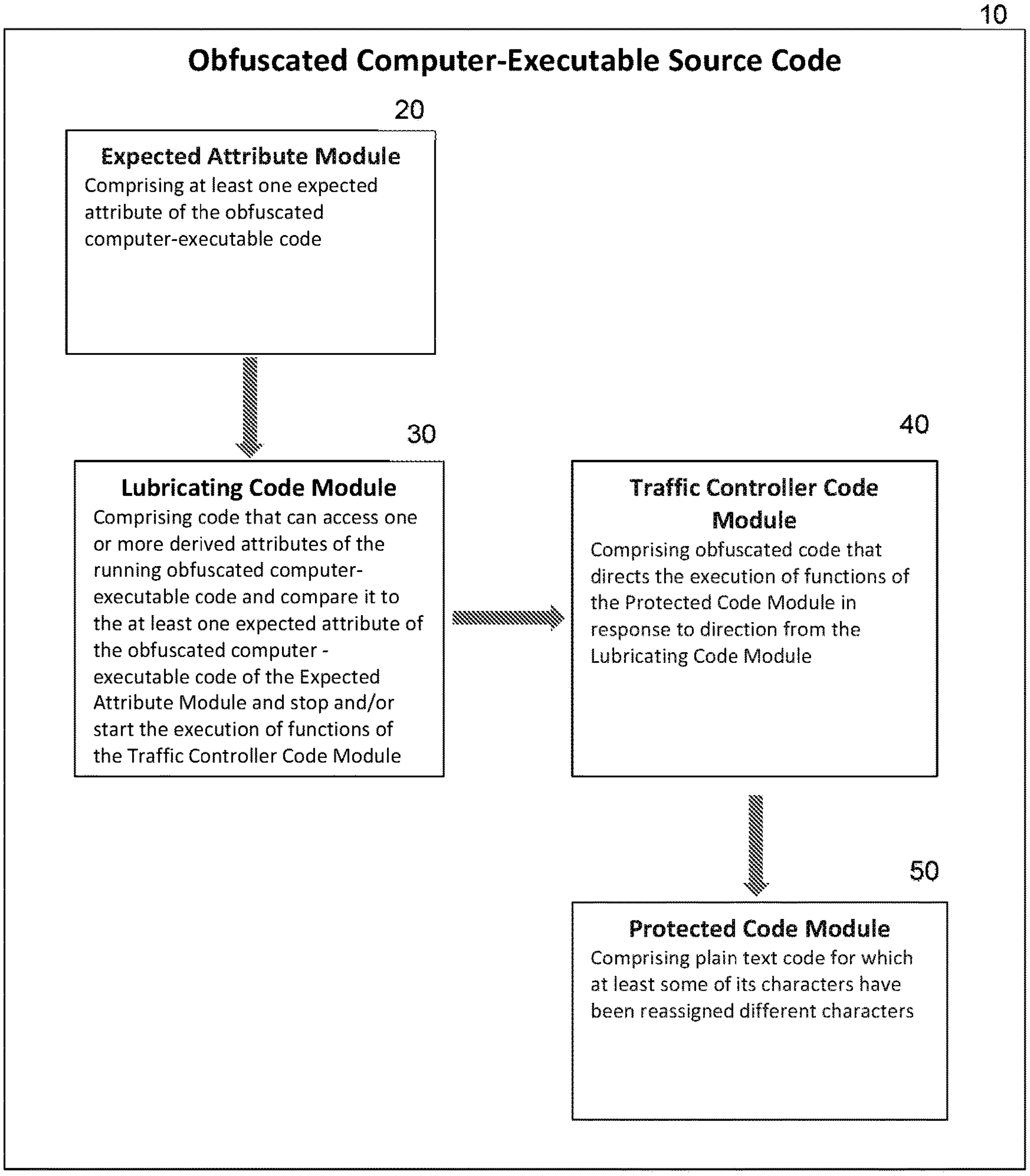
FIG. 1 is a schematic block diagram of an obfuscated computer-executable source code of an embodiment of the invention.

The invention provides an obfuscated code and/or script for use to protect the contents of code and/or script against hacking and/or other intrusions, whether malicious or otherwise. For purposes of clarity, the broader term "code" is repeatedly used herein, although a person of skill in the art understands that in certain applications the more specific type of "code" known as "script" can be applied.

For purposes of description, exemplary discrete code, script, modules and embodiments are provided (e.g., named or numbered modules; geometric shapes in flowcharts with number designations; descriptions of exemplary data, functions and processes). However, the functions, processes and features of some or all of these discrete codes, scripts, modules and embodiments can be combined into one or more (or split into fewer) other codes, scripts, modules and embodiments, and should not be considered to necessarily limit the description to require separate or combined entities (e.g., codes, scripts, modules, embodiments) to perform the functions and processes and obtain the features, benefits and advantages described herein.

In preferred embodiments, the methods, functions and processes described herein can be configured to provide one or more particular components (e.g., codes, scripts, modules, databases, interfaces, devices) and have one or more particular computer-executable functions. In these preferred embodiments, components for executing such code, script, modules, etc., include some or all of a computerized system and/or server. However, the codes, scripts, modules, databases and/or interfaces can be integrated or further separated into additional codes, scripts, modules, databases and/or interfaces and/or take any other form that allows them to communicate with each other and perform the functions required. In this regard, servers, components and/or consoles and/or any other such elements could be added (or subtracted) and/or changed to perform the functions desired.

Obfuscated Computer-Executable Source Code Embodiments

In this example, embodiments of an obfuscated code of this invention are described in terms of its layout, design and construction pattern. These are versions that potentially can be given to a third party (e.g., the public) to use. The following describes the embodiments of this obfuscated code and the obfuscation tools (e.g., functions and processes) that are used by an operator to derive or otherwise create and use it.

Three stages (e.g., stages 1, 2 and 3) or modules are described for these embodiments as examples of functions and processes of this invention. These three stages can be each split into multiple stages or modules, or be combined into less stages or modules, and they are illustrated here in three stages for purposes of showing examples of the invention and therefore the invention is not limited to or by these illustrations. The three stages or modules described herein should not be construed to have an order or temporal requirement, unless specifically stated, and they can be repeated once or multiple times according to the application desired.

In certain embodiments, there is similar code used between the stages, including, in preferred embodiments, stages 1, 2 and 3. This similar code uses values produced from previous stages to calculate the values needed to proceed to the next stage.

Lubricating code, which may be provided in the form of one or more modules in certain embodiments (e.g., Lubricating Code Module) is used in the stages of certain embodiments of this example. The lubricating code is used to derive attributes of the running, obfuscated code and thus the lubricating code comprises a record of one or more derived attributes of the running, obfuscated computer-executable code. In the most preferred embodiments, the lubricating code will prepare all the values that will be needed to unlock the rest of the code so that it completes execution successfully if no compromise of the code is detected.

The lubricating code that is developed and the values it produces will be used to tell the traffic controller of stage 2 where to go, and what to do with the execution of the obfuscated code. In certain of these embodiments, the lubricating code can stop and/or start the execution of a traffic controller code.

For the lubricating code, any native modules (if any) needed to operate the obfuscated code are first loaded up. Then, code is written that will cause the obfuscated code to read itself. After that, the content is scanned to determine how many lines and characters (or other attributes) are in the obfuscated code. For certain embodiments, the results of this scan are referred to herein as "one or more derived attributes of the running obfuscated computer-executable code." After that, these numerical values and/or attributes are stored in different variables that will be used throughout the code.

The numbers derived from the above-described scan results are known by the operator, prior to, and during, the building of the obfuscated code. Therefore, the operator has the capability of being able to use the numbers beforehand to pave and mandate the path of execution the obfuscated code should take before it reveals its hidden plain text code to the interpreter.

The operator uses those numbers derived from the above scan to dictate which items in a specific list to grab. The operator strategically deposits values in specific places in different lists. These places are identified by numbers. And those numbers, are derived from the expected attributes of the running/executed obfuscated code. After all the right items are retrieved from a list, the resulting text dictates the next path forward for the execution of the obfuscated code.

This lubricating code may be in a separate module or modules, or its functions and processes can be incorporated into another module or modules.

a. Stage 1

In stage 1, a protected code is used in this example. The protected code may be provided in the form of one or more modules in certain embodiments (e.g., Protected Code Module). The protected code comprises plain text code for which at least some of its characters have been reassigned different characters. The protected code is stored in a second named variable.

In certain embodiments, the data in this variable is encoded using base64/openssl, and then it has its letters reassigned to different characters. For example, after base64ing a code, the operator reassigns all the letters from the body of the base64/openssl output to something else (for example, A becomes E, E becomes S, X becomes W and so on). This is done to ensure the letters mean only what the operator wants them to mean.

This step helps harden the security of the code. It also adds layers of difficulty to the anyone attempting the task of trying to figure out what the code does. When the obfuscated code is finalized and given to a user to execute, the logic in the obfuscated code will know how to reassign the letters back to what they should be for base64 to decode it. In preferred embodiments, the success of decoding this data depends on the ability of the traffic controller (stage 2) to perform its validations. If the traffic controller encounters any issues during execution, this content will not be unveiled.

b. Stage 2

In stage 2, a traffic controller code is used in this example. The traffic controller code may be provided in the form of one or more modules in certain embodiments (e.g., Traffic Controller Code Module). The traffic controller code, which is obfuscated in preferred embodiments, is stored in a second named variable.

The traffic controller code determines where to direct the execution of the protected code by effectively asking itself, "is the execution of this code safe? Or is the person running the code attempting to investigate it?" If the execution is deemed to be malicious, it halts the execution of the code and does not allow it to proceed to the next stages of the security checks. Also, if the execution is deemed malicious, it can either flat out abort the execution or it can redirect the execution flow to a different destination, one that is certain to result in a dead-end, which will generate a "Tamper Resistance" alert. These determinations by the traffic controller code are performed by its reference to the lubricating code.

This is essentially an important part of this example, namely, because the traffic controller in preferred embodiments is obfuscated, it has to be decoded first, and then executed before it can direct traffic. This means that if the obfuscated code is compromised, the traffic controller will not run, which also means the protected code will not be executed since there will be nothing to process it.

If the traffic controller is successfully decoded, and it is able to execute without suspecting any attempted intrusions, it will unwrap/unveil the "box" containing the plain text code, which is its ultimate goal if the code has not been compromised.

One way of envisioning these embodiments of this example is the plain text code is tucked away deep in a "cave", so to speak. The path to reach its exact location is paved by and with the expected attributes (e.g., matching or corresponding to the number of lines, number of characters) of the obfuscated code, for which only the operator has the knowledge.

In certain preferred embodiments, the traffic controller function of controlling the execution of the protected code is done in conjunction with the lubricating code which compares one or more derived attributes of the running obfuscated-executable code with the at least one expected attribute of the obfuscated computer-executable code (of stage 3) to determine whether anyone has attempted to tamper with the source code.

The most preferred embodiments of the source code described here use embodiments of a traffic controller (e.g., embodiments of traffic controller code, embodiments of Traffic Controller Code Module). The most preferred embodiments of the traffic controller (e.g., stored in a second named variable) are part of the obfuscated code. It is encoded. It gets decoded to raw code only during a valid/non-intrusive execution of the obfuscated code. During a valid non-intrusive execution of the obfuscated code, the traffic controller knows which part of the obfuscated code to look at to successfully execute the obfuscated code. It scans or self-reads itself and goes on a hunt to find each of the pieces of the puzzle needed to determine the next path forward. It uses pre-recorded/pre-known numerical attributes of the obfuscated code to navigate its way around the scanned obfuscated code. These numerical attributes are generated at the time the code was obfuscated by embodiments of this invention: in the most preferred embodiments these include (a) the number of lines in the obfuscated code, (b) the number of characters in the obfuscated code, and/or (c) the name of the obfuscated code at the time of obfuscation.

d. Stage 3

In stage 3, a key is used, which in preferred embodiments of this example is an expected checksum value and the expected number of characters in the obfuscated code.

In certain embodiments, these values are stored after a delimiter in the obfuscated code, and they are located at the end of the code. Other variable names can be used. The aforementioned variable, along with the lubricating code, contains instructions that are used to tell the obfuscated code what to do and where to look for each of the values it needs in order to successfully perform its validations.

The attributes of the obfuscated code dictate which segment of text, at the end of the obfuscated code, to look to in order to grab the key (e.g., the expected checksum value and expected number of characters). Therefore, if the obfuscated code is compromised, the wrong value in the wrong position in a list will be grabbed, which ensures that the execution of the obfuscated code fails.

It is important to note that in the most preferred embodiments, while the expected attributes of the obfuscated code are stored in the obfuscated code itself, they are not explicitly stated. Meaning, if, for example, the expected character count is 107454, the number stored in the obfuscated code could be 107423.

The obfuscated code in preferred embodiments uses the pre-known attributes of the code—e.g., the number of lines—to calculate what the actual total count of characters should be. It does this by adding to, removing from, multiplying, and dividing using the number of lines.

In certain embodiments, some or all of the functions and processes of this stage 3 is provided in the form of an Expected Attribute Module, which comprises at least one expected attribute of the obfuscated code.

FIG. 1 is a schematic block diagram of a preferred embodiment of an obfuscated computer-executable source code 10 of this invention. Four components of the code are shown in FIG. 1. These include an Expected Attribute Module 20 that comprises at least one expected attribute of the obfuscated computer-executable code. Also shown is a Lubricating Code Module that comprises code that can access one or more derived attributes of the running obfuscated computer-executable code and compare it to the at least one expected attribute of the obfuscated computer-executable code of the Expected Attribute Module 30 and then stop and/or start the execution of functions of the Traffic Controller Code Module 40.

The Traffic Controller Module 40 of FIG. 1 comprises obfuscated code that directs the execution of functions of the Protected Code Module 50 in response to the comparison done by the Lubricating Code Module. The Protected Code Module 50 is comprised of plain text code for which at least some, but preferably all, of its characters have been reassigned different characters.

Figure 2:
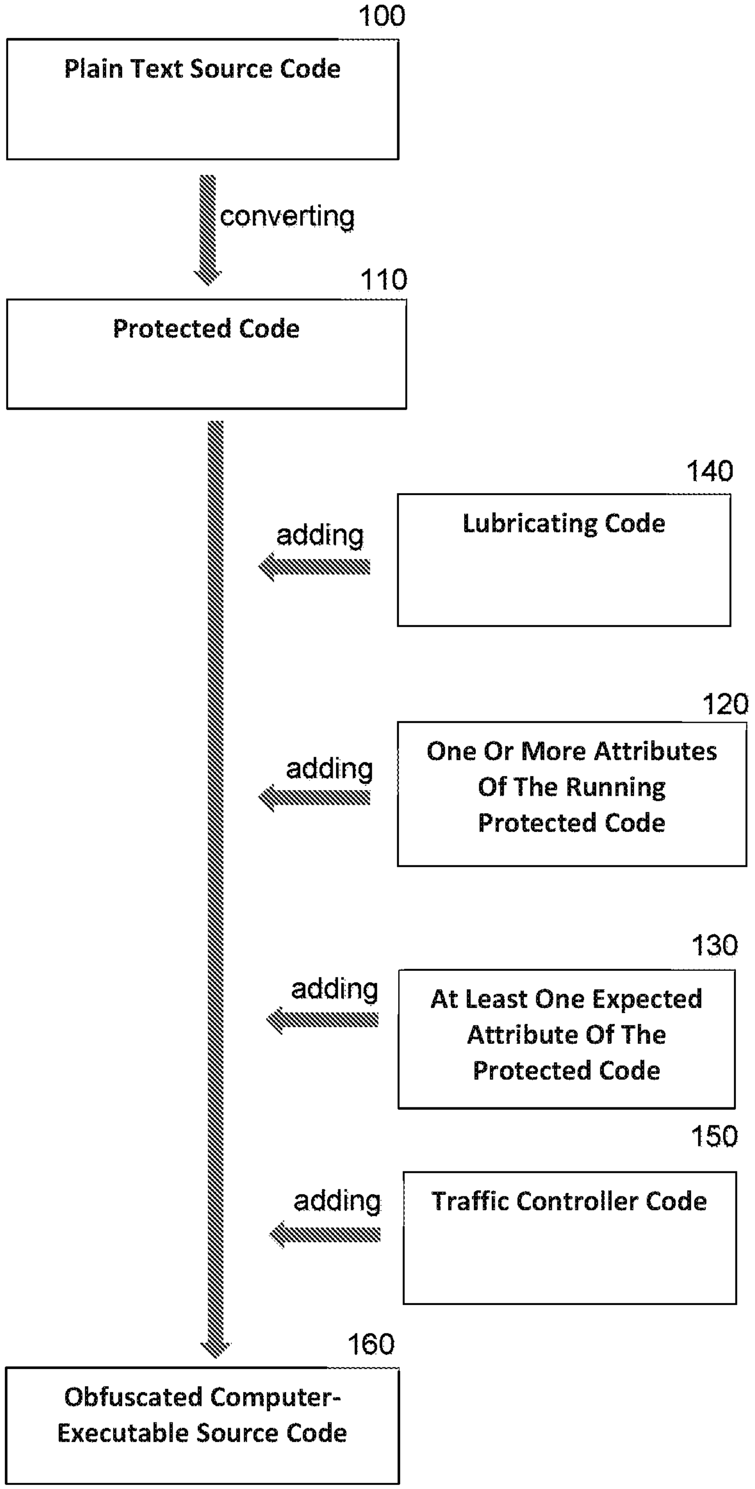
FIG. 2 is a schematic block diagram of a method for creating an obfuscated computer-executable source code of an embodiment of the invention.

FIG. 2 is a schematic block diagram of a preferred embodiment of a method for creating an obfuscated computer-executable source code 160 of this invention. Five steps are shown in FIG. 2. The order of the steps that is shown in the figure is not important and different orders of the steps can be used. These steps include a converting (translating) of plain text source code 100 into protected code 110. A preferred embodiment of this step is described herein (e.g., reassigning some, and preferably all, of the plain text code characters to different characters). Several addition steps are shown in FIG. 2, including adding one or more attributes of the running protected code 120, adding at least one expected attribute of the protected code 130, adding lubricating code 140, and adding traffic controller code 150, in order to create the obfuscated computer-executable source code 160 of the figure. The lubricating code 140 added here in preferred embodiments comprises code that can access one or more derived attributes of the running protected (or obfuscated computer-executable code) and compare it to the at least one expected attribute of the protected (or obfuscated computer-executable) code. The traffic controller code 150 of FIG. 2 in preferred embodiments comprises obfuscated code that directs the execution of functions of other code in response to the comparison done by the lubricating code 140 in this embodiment.

These functions and processes of such methods for protecting source code by this invention can be done manually by one or more operators. In preferred embodiments, these functions and processes are done automatically by computer-executable instructions, programs or code.

Additional Obfuscated Computer-Executable Source Code Embodiments.

Figure 3:
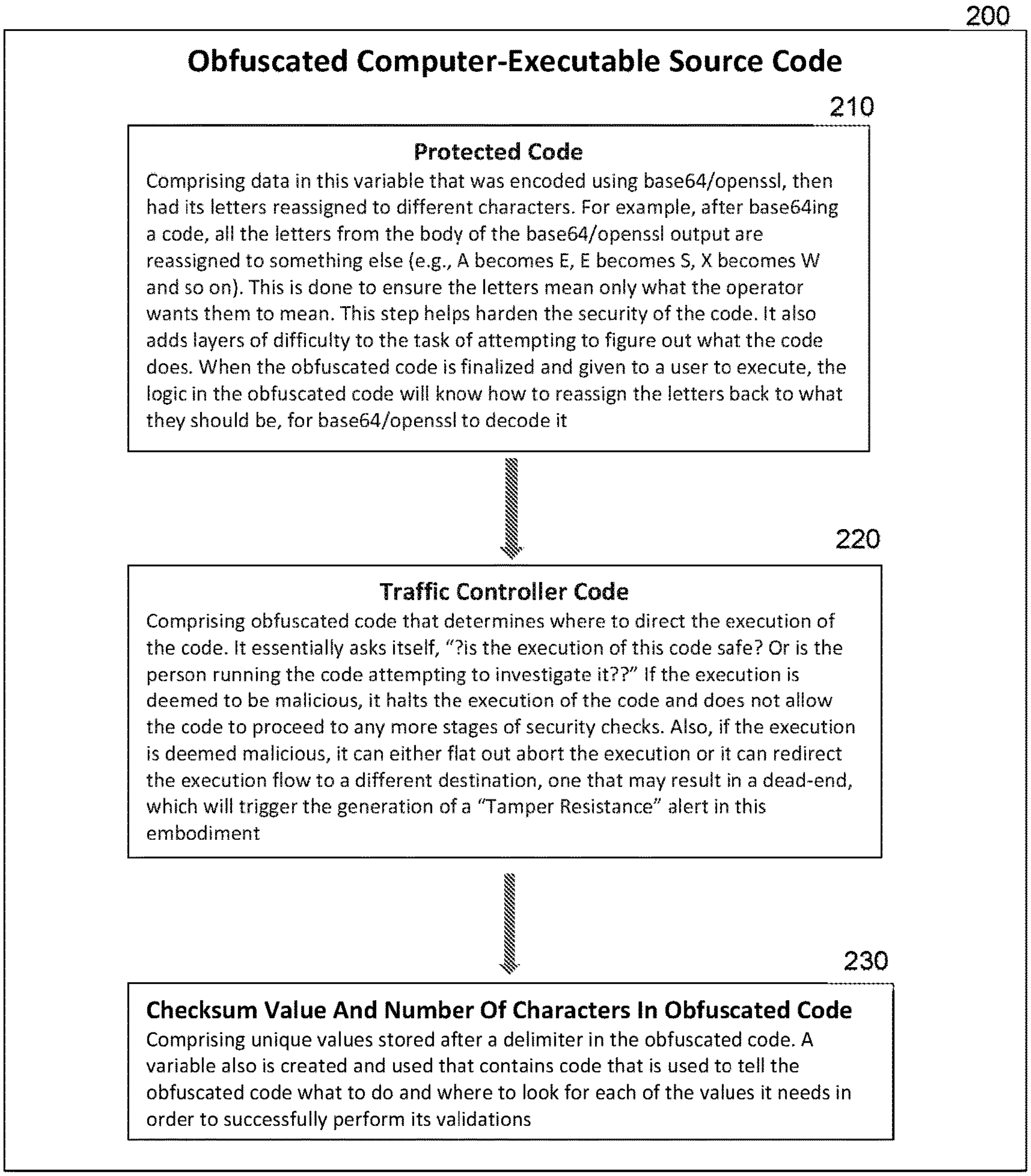
FIG. 3 is a schematic block diagram of an obfuscated computer-executable source code of an embodiment of the invention.

FIG. 3 is a schematic block diagram of additional obfuscated computer-executable source code 200 embodiments. This code is shown with three of its components or parts, Protected Code 210, Traffic Controller Code 220, and Checksum Value And Number Of Characters In Obfuscated Code 230.

The Protected Code 210 component or part of FIG. 3 contains data in this variable that was encoded using base64/openssl, then had its letters reassigned to different characters. For example, after base64ing a code, all the letters from the body of the base64/openssl output are reassigned to something else (e.g., A becomes E, E becomes S, X becomes W and so on). This is done to ensure the letters mean only what the operator wants them to mean. This step helps harden the security of the code. It also adds layers of difficulty to the task of attempting to figure out what the code does. When the obfuscated code is finalized and given to a user to execute, the logic in the obfuscated code will know how to reassign the letters back to what they should be, for base64/openssl to decode it. In a most preferred embodiment, the protected code is stored in a second named variable.

The Traffic Controller Code 220 component or part of FIG. 3 determines where to direct the execution of the code. It essentially asks itself, "? is the execution of this code safe? Or is the person running the code attempting to investigate it??" If the execution is deemed to be malicious, it halts the execution of the code and does not allow the code to proceed to any more stages of security checks. Also, if the execution is deemed malicious, it can either flat out abort the execution (as mentioned above) or it can redirect the execution flow to a different destination, one that is certain to result in a dead-end, which will cause the generation of a "Tamper Resistance" or other alert if so configured. The traffic controller is obfuscated. Which means it must be decoded first, then executed before it can direct traffic. Which also means that if the obfuscated code is compromised in any way, the traffic controller will not run, which also means the protected code will not be executed since there will be nothing to process it. In a most preferred embodiment, the traffic controller code is stored in a second named variable.

The Checksum Value And Number Of Characters In Obfuscated Code 230 component or part of FIG. 3 are the unique values stored after a delimiter in the obfuscated code. A variable contains code that is used to tell the obfuscated code what to do and where to look for each of the values it needs in order to successfully perform its validations.

These three components or parts of the embodiments of FIG. 3 are examples of what particular code may be practicing these embodiments of the invention.

In certain preferred embodiments, the obfuscated computer-executable source code is written in the programming language selected from the group consisting of shell, perl, python, php, ruby, Rcode, powershell, and javascript. In certain more preferred embodiments, the obfuscated computer-executable source code is executable by the interpreter for the programming language in which it is written. In certain of the most preferred embodiments, the obfuscated computer-executable source code is executable by the interpreter for the programming language selected from the group consisting of shell, perl, python, php, ruby, Rcode, powershell, and javascript.

In preferred embodiments, one or more derived attributes of the running obfuscated computer-executable code is a checksum value and the number of characters in the obfuscated computer-executable code. In more preferred embodiments, at least one expected attribute of the running obfuscated computer-executable code is a checksum value and the expected number of characters in the obfuscated computer-executable code. If the different (derived and expected) checksum values and/or number of characters differ, the traffic controller code may stop the execution of the protected code, because such a mis-match may indicate tampering. In the most preferred embodiments, if the traffic controller code stops the execution of the protected code, a user of the code is notified.

Example 1

A prospective preferred embodiment of an obfuscated computer-executable code comprises four components or parts of the code (that can be also done by more or less components or parts). These components or parts include (a) a lubricating code that comprises code that can access one or more derived attributes of the running obfuscated computer-executable code and stop and/or start an execution function of a traffic controller code; (b) a protected code that comprises plain text computer-executable code for which at least some of its characters have been reassigned different characters; (c) the traffic controller code that comprises obfuscated code that functions to direct the execution of the protected code according to direction from the lubricating code; and (d) at least one expected attribute of the obfuscated computer-executable code.

In this example, the traffic controller code will stop the execution of the protected code according to the direction from the lubrication code, including whether the lubricating code determines that the one or more derived attributes of the running obfuscated computer-executable code do not correspond to the at least one expected attribute of the obfuscated computer-executable code. This determination relates to whether there has been an attempt to tamper with the code, and it can include a determination that the name of the code has been changed or content removed or added to the code, which are two indications of possible malicious intent.

In certain preferred embodiments, the obfuscated computer-executable source code is written in the programming language selected from the group consisting of shell, perl, python, php, ruby, Rcode, powershell, and javascript. In certain more preferred embodiments, the obfuscated computer-executable source code is executable by the interpreter for the programming language in which it is written. In certain of the most preferred embodiments, the obfuscated computer-executable source code is executable by the interpreter for the programming language selected from the group consisting of shell, perd, python, php, ruby, Rcode, powershell, and javascript.

In preferred embodiments, the one or more derived attributes of the running obfuscated computer-executable code is a checksum value and the number of characters in the obfuscated computer-executable code. In more preferred embodiments, the at least one expected attribute of the running obfuscated computer-executable code is a checksum value and the expected number of characters in the obfuscated computer-executable code. If the different (derived and expected) checksum values and/or number of characters differ, the traffic controller may stop the execution of the protected code, because such a mis-match may indicate tampering. In the most preferred embodiments, if the traffic controller code stops the execution of the protected code, a user of the code is notified.

Example 2

A prospective preferred embodiment of a method of protecting computer-executable source code by creating an obfuscated computer-executable source code comprises four functions. These functions include (a) converting (translating) plain text source code into encoded text (e.g., obscured code) resulting in a protected code; (b) adding one or more attributes of the running protected code (via, for example, a lubricating code or Lubricating Code Module); (c) adding at least one expected attribute of the protected code; (d) adding lubricating code; and (e) adding traffic controller code that will stop the execution of the protected code if a lubricating code determines that the one or more attributes of the running protected code do not correspond to the at least one expected attribute of the protected code.

In this example, the traffic controller code will stop the execution of the protected code according to the direction from the lubrication code, including whether the lubricating code determines that the one or more derived attributes of the running protected (or obfuscated computer-executable) code do not correspond to the at least one expected attribute of the protected (or obfuscated computer-executable) code. This determination relates to whether there has been an attempt to tamper with the code, and it can include a determination that the name of the code has been changed or content removed or added to the code, which are two indications of possible malicious intent.

In certain preferred embodiments, the obfuscated computer-executable source code is written in the programming language selected from the group consisting of shell, pert, python, php, ruby, Rcode, powershell, and javascript. In certain more preferred embodiments, the obfuscated computer-executable source code is executable by the interpreter for the programming language in which it is written. In certain of the most preferred embodiments, the obfuscated computer-executable source code is executable by the interpreter for the programming language selected from the group consisting of shell, perl, python, php, ruby, Rcode, powershell, and javascript.

In preferred embodiments, the one or more derived attributes of the running obfuscated computer-executable code is a checksum value and the number of characters in the obfuscated computer-executable code. In more preferred embodiments, the at least one expected attribute of the running obfuscated computer-executable code is a checksum value and the expected number of characters in the obfuscated computer-executable code. If the different (derived and expected) checksum values and/or number of characters differ, the traffic controller may stop the execution of the protected code, because such a mis-match may indicate tampering. In the most preferred embodiments, if the traffic controller code stops the execution of the protected code, a user of the code is notified.

In this example the steps can be done in different order than is described herein, and some of the steps can be split into one or more additional steps or combined into one or more steps. These functions and processes of the method can be done manually by one or more operators. In preferred embodiments, these functions and processes are done automatically by computer-executable instructions, programs or code, wherein the method is implemented by a computing device programmed to perform the method.

Example 3

Instructions are provided for applying an embodiment of this invention in this example that make an obfuscation tool that converts (translates) or otherwise creates obfuscated code. First, the user creates a config file that allows the user to turn on and off certain behaviors of an obfuscated code. Next, the config file is used to give users the option of enabling or disabling a code duplication guard, add an expiration date to a code, dictate how many or which users can run the code and on which hosts, and/or enable/disable the ability of the obfuscated code to send external signals in the event of a malicious attack. Next, whenever a code is submitted for obfuscation via embodiments of this invention, the obfuscation tool will first read this config file to determine what level of protection to apply to the obfuscated code. After the config file is read, then the construction of the obfuscated code begins. It is important that at no point can the content of the obfuscated code ever be readable by a human being (as opposed to a programming language interpreter).

1A. To ensure it is not readable, encode the original code first, using base64 or openssl.

1B. When building the body of the obfuscated code, make sure the final/finished copy has no more than 2 or 3 lines. This means to replace the new line characters with ";". This results in the code having very long lines.

1C. Also make sure the variable names used are not intuitive. Use very short and similar names (e.g., jOX, JOx).

2. Replace many letters (and preferably one half, most preferably all) from the output of the base64/openssl, with different characters.

3. Break up the resulting text into three or more parts.

4. Re-arrange the parts.

5. Make sure the parts are not in order.

6. Put part 1 in the position of part 2. Put part 2 in the position of part 3. Put part 3 in the position of part 1.

7. Join the parts together using different delimiters.

8. Join part 2 with part 3 with a delimiter.

9. Then join part 2 and part 3 with part 1 using a different delimiter.

10. Put the resulting output into a first named variable.

11. Create variables that will contain various values. These values will represent the characteristics/attributes of the final obfuscated code.

12. Determine how many characters each obfuscated code is supposed to have and know how many lines of code each obfuscated code will contain.

13. Since the number of lines of an obfuscated code will be more than 2 or 3, use those numbers to navigate the execution of this protected code to successful completion.

14. Write a code logic that will cause the obfuscated code to self-read itself at run time and count the number of lines and characters it has. Then, those two numbers are saved to one or more variables.

15. The logic then looks in a specific section of the obfuscated code to retrieve the expected number of characters the obfuscated code was coded to have at the time of its obfuscation. It divides that number with the number of characters returned from #14.

15A. The exact expected number of characters of an obfuscated code is ascertained by counting a section of the code which has static code. By static, it is meant the code that is instrumental to the execution of the obfuscated code. These sections are separated by unique delimiters. Also, the checksum of this same static section is taken during the construction of the obfuscated code. This checksum value is stored at the end of the obfuscated code.

In alternative embodiments of this step, the exact expected number of characters of an obfuscated code is ascertained by reading only the section of the obfuscated code that will be executed. Certain parts of the obfuscated code which do not affect execution are ignored. These are sections that a would be attacker wouldn't edit.

16. After the count of characters from the static section in step #15 is subtracted from the total count of all characters in the entire code, write code that will calculate what the final/correct number should be using the expected attributes of the running code. Steps #17-#17C address this further.

17. Use very unique delimiters to make distinctions of which part of the obfuscated code is which and which to grab.

17A. Use delimters such as "_-_", "_--_" and many others.

17 B. In between these delimiters are values that represent what the expected checksum of a large portion of the obfuscated code is supposed to be. And also, how many characters the code is expected to have.

17C. To successfully get the checksum of a running obfuscated code, and compare it to what has been clandestinely stored in the code itself during its construction, examine a specific portion of the obfuscated code. Not the entire code. But that specific portion to examine is about 90% of the code itself.

18. Write code for the traffic controller. The traffic controller will be the one directing the execution of the obfuscated code.

19. Use base64/opensil to encode the traffic controller.

20. Break up and rearrange the encoded traffic controller code, using the same logic as described in #2-#9. Then, store the resulting text into a second named variable.

21. Write code that will gather the characteristics of the obfuscated code at run time, and compare that to the expected values stored at the end of the code, separated by unique delimiters. That would be the values mentioned in steps #17-#17C. The code written here in this step #21 is linked with code written in preceding steps and is spread throughout the obfuscated code.

22. When all the linked preceding code runs and then happens to find that the numbers do not match, it will be because the obfuscated code has been tampered with, and as such, the current execution must be aborted.

23. If the numbers match, direct the execution of code to a successful completion.

23A. The direction of the obfuscated code to a successful completion means the obfuscated content of the second named variable will be decoded and executed.

23B. The execution of the code in the second named variable will then read in the content of the first named variable. It will decrypt that. Once properly decrypted, it will pass it to the interpreter to be executed.

END. Create config file that allows you to turn on and off certain behaviors of an obfuscated code. Provide users the option to enable or disable code duplication guard, how many or which users can run the code and on which hosts.

Example 4

A prospective preferred embodiment of an obfuscated computer-executable code comprises three components or parts of the code (that can be also done by more or less components or parts). These components or parts include (a) protected code that comprises plain text computer-executable code for which at least some of its characters have been reassigned different characters; (b) traffic controller code that comprises obfuscated code that functions to direct the execution of the protected code; and (c) a checksum value and number of characters comprising values stored after a delimiter that informs the obfuscated computer-executable code where to look for values it needs to perform validations.

In this example, the traffic controller code will stop the execution of the protected code according to the checksum values and number of characters. In the most preferred embodiments, the traffic controller code will stop the execution of the protected code if the checksum values and number of characters are derived from the running obfuscated computer-executable code and they do not match what was expected for these values. This determination relates to whether there has been an attempt to tamper with the code, and it can include a determination that the name of the code has been changed or content removed or added to the code, which are two indications of possible malicious intent.

In certain preferred embodiments, the obfuscated computer-executable source code is written in the programming language selected from the group consisting of shell, perl, python, php, ruby, Rcode, powershell, and javascript. In certain more preferred embodiments, the obfuscated computer-executable source code is executable by the interpreter for the programming language in which it is written. In certain of the most preferred embodiments, the obfuscated computer-executable source code is executable by the interpreter for the programming language selected from the group consisting of shell, perl, python, php, ruby, Rcode, powershell, and javascript.

In preferred embodiments, the checksum value and the number of characters are derived attributes from the running obfuscated computer-executable code. In more preferred embodiments, the checksum value and the expected number of characters in the obfuscated computer-executable code is compared to what was expected for these values. If the different (derived and expected) checksum values and/or number of characters differ, the traffic controller may stop the execution of the protected code, because such a mismatch may indicate tampering. In the most preferred embodiments, if the traffic controller code stops the execution of the protected code, a user of the code is notified.

Example 5

This prospective example addresses how embodiments of this invention can be used to engage in more effective and safe licensing of source code.

Before this invention, the idea of licensing source code was to have a contractual "agreement" with a customer about the usage of a particular unprotected code. This "agreement" generally attempts to dictate how many users are allowed to use the code, and on how many hosts the code is allowed to run on. This method relies heavily on the good nature of the user in question which of course renders it useless for many applications. It is often observed that if you give customers a plain text code, there is little stopping them from reading it and getting ideas from it. Thus, this traditional licensing method is not effective because there are many different ways ideas from source code can be stolen. Unscrupulous individuals do not have to steal the entire code. They can easily sift through an unprotected code and glean bits and pieces of unique methods of doing things from that code. They can then turn around and use these little pieces of stolen information to augment or create their own version of the unprotected code.

Now, when a code is protected using embodiments of this invention, the raw plain text code becomes safely tucked away behind layers of obfuscation. It is in this obfuscated state that licensing, should it be needed, can be made truly effective. When a customer is given an obfuscated code to run, and the customer goes and runs that obfuscated code, a few security checks must happen. In other words, before the obfuscated code can execute the protected code, it has to go through layers of checks.

These checks will be (as far as licensing is concerned) to check timestamps and ensure the date/time the obfuscated code is allowed to run until has not been reached. It does this by either checking against the local system clock OR against our servers, via the internet. The latter is of course the most secure method. But users may be given, in some embodiment, the option to turn that off/on depending on their preference.

Some customers do not care to apply timestamp/license checks to their code. They just want it obfuscated to ensure the raw plain text version is safely out of reach. Any user who then takes the mischievous step to go deeper to investigate the obfuscated code will be in clear violation of the licensing terms, which will clearly state something to the effect of "The author of this code has chosen to keep the plain text code veiled. Any attempt to unveil or access this protected body of code will be seen as a clear and direct violation of licensing agreement." Note, this is all automated and the user does not have to do anything. It is built into the obfuscated code.

A customer will know when the license to use a protected code has expired when he discovers he is unable to run the protected code past its validity date. When an obfuscated code is run past its validity date, an error message will be displayed and the execution of the code will abort.

Example 6

In this example, the application of embodiments of this invention are applied to a prospective customer who has written a plain text code in python. We will call this code "xtest.py" for this example, although other names could be used. The customer wishes to convert this plain text python code into an unreadable (by the naked eye), yet executable python code. The customer engages the exemplary enScrypt.io team to protect his python code for him.

The enScrypt.io team receives the customer's plain text code, then submits it to the enScrypt.io protection software. The enScrypt.io has separate protection software for several languages including (1) shell/bash=shenscrypt, (2) Perl=plenscrypt, (3) Python=pyenscrypt, (4) Ruby=rbenscrypt, (5) Php=phpenscrypt, (6) R=rRenscrypt, (7) Powershell=psIenscrypt, (8) Javacode=jsenscrypt. So, when the enScrypt.io team submits the customer's plain text code to the protection software, they would be submitting it to pyenscrypt since the customer's code is a python code.

The enScrypt.io protection software then applies the logic of FIG. 1, FIG. 2, FIG. 3 and/or the examples set forth herein: It essentially takes in the code and obfuscates it into a base64 format. It then chops up the base64 string into different pieces, which will act as pieces of a puzzle. It then creates a new empty file and begins to add code to it. When this new file has been fully updated, it will serve as the obfuscated copy of the plain text code. After the chopping is complete, it places the pieces of the puzzle in different areas in the body of the obfuscated code. During execution of the obfuscated code, these different pieces will be retrieved from wherever they are in the body of the obfuscated code using numbers that describe the obfuscated code. For example, the obfuscated code is expected to have 2 lines. So, when the code is executed, it self-reads itself and counts the number of lines it has. Then, it takes that number and uses it to grab item 2 from a list (assuming of course that the user has not tampered with the code and the code still has 2 lines as expected). The number of lines is used several times. It is added to, subtracted from, multiplied and divided to get the values that are used to retrieve/locate other pieces of the puzzle. This process makes everything connected. The count of all characters in the code is used as well.

The enScrypt.io protection software takes in the customer's plain text code and basically does the following: Converts it to an encoded base64 text. Breaks the text into chunks, re-arranges the chunks from their natural order. Begins to build a new code from scratch, starting with an empty file then adds code to it while making sure that all lines of code added to the new code do not exceed 2 lines. After adding all the necessary lines of code to the new code, it does a checksum of all the text added to the new code so far. Then, it appends the checksum values to the end of the code and it uses a delimiter as a unique separator. The checksums/character count is added after the delimiter.

It then finalizes the new code and gives it the same name as the original code the customer submitted and the freshly obfuscated code is then given back to the customer. The customer tests the obfuscated version of his code, and confirms it works exactly as the original. However, it is now protected against several methods of hacking and/or applications of malicious intent.

Particular Applications to Computer Devices

The system applied to this invention may include a plurality of different computing device types. In general, a computing device type may be a computer system or computer server. The computing device may be described in the general context of computer system executable instructions, such as program modules, being executed by a computer system (described for example, below). In some embodiments, the computing device may be a cloud computing node (for example, in the role of a computer server) connected to a cloud computing network (not shown). The computing device may be practiced in distributed cloud computing environments where tasks are performed by remote processing devices that are linked through a communications network. In a distributed cloud computing environment, program modules may be located in both local and remote computer system storage media including memory storage devices.

The computing device may typically include a variety of computer system readable media. Such media could be chosen from any available media that is accessible by the computing device, including non-transitory, volatile and non-volatile media, removable and non-removable media. The system memory could include random access memory (RAM) and/or a cache memory. A storage system can be provided for reading from and writing to a non-removable, non-volatile magnetic media device. The system memory may include at least one program product having a set (e.g., at least one) of program modules that are configured to carry out the functions of embodiments of the invention. The program product/utility, having a set (at least one) of program modules, may be stored in the system memory. The program modules generally carry out the functions and/or methodologies of embodiments of the invention as described herein.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects "system." Furthermore, aspects of the disclosed invention may take the form of a computer program product embodied in one or more computer readable media having computer readable program code embodied thereon.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

OTHER EMBODIMENTS

Although the present invention has been described with reference to teaching, examples and preferred embodiments, one skilled in the art can easily ascertain its essential characteristics, and without departing from the spirit and scope thereof can make various changes and modifications of the invention to adapt it to various usages and conditions. Those skilled in the art will recognize or be able to ascertain using no more than routine experimentation, many equivalents to the specific embodiments of the invention described herein. Such equivalents are encompassed by the scope of the present invention.

What is claimed is:

1. A computer program product embodied on a non-transitory computer readable medium that comprises an obfuscated computer-executable source code, when executed by processor of a computer, said obfuscated computer-executable source code self-reads itself to protect various source codes comprising source code written in programming languages selected from the group consisting of shell, perl, python, php, ruby, Rcode, powershell and javascript, wherein said obfuscated computer-executable source code capable of running on the computer by an interpreter that executes instructions written in a programming language, wherein the obfuscated computer-executable source code comprises:

(a) lubricating code which is in a form of lubricating code module and comprises a record of one or more derived attributes of running the obfuscated computer-executable source code and is capable of processing all values that are needed to unlock the rest of the obfuscated computer-executable source code so that the obfuscated computer-executable source code completes execution successfully if no compromise of the obfuscated computer-executable source code is detected, capable of comparing the one or more derived attributes of the running obfuscated-executable source code with at least one expected attribute of the obfuscated computer-executable source code to determine whether anyone has attempted to tamper with the obfuscated computer-executable source code thereby protecting contents of the obfuscated computer-executable source code and/or script against hacking, malicious attack and other intrusions and capable of stopping and/or starting an execution function of a traffic controller code;

(b) a protected code converted from a plain text computer-executable code wherein some characters of the plain text computer-executable code have been reassigned to different characters;

(c) the traffic controller code which comprises obfuscated code and controls execution of the protected code in response to the comparison, wherein the traffic controller code reassembles and directs execution of the protected code according to direction from the lubricating code;

wherein said at least one expected attribute of the obfuscated computer-executable source code comprises an expected number of characters in the obfuscated computer-executable source code; and wherein the traffic controller code stops the execution of the protected code according to the direction from the lubricating code, wherein said direction from the lubricating code refers to execution of functions of the protected code in response to the comparison performed by the lubricating code which determines that the one or more derived attributes of the running obfuscated computer-executable source code do not correspond to the at least one expected attribute.

2. The computer program product of claim 1, wherein the obfuscated computer-executable source code is executable by the interpreter for a programming language in which the interpreter is written.

3. The computer program product of claim 1, wherein the one or more derived attributes of the running obfuscated computer-executable source code comprise a checksum value and a number of characters in the running obfuscated computer-executable source code.

4. The computer program product of claim 1, wherein the obfuscated computer-executable source code comprises a function of notifying a user of the obfuscated computer-executable source code if the traffic controller code stops the execution of the protected code.

5. A method of protecting computer-executable source code against hacking, malicious intent and other intrusions the method comprising steps in the following order:

(a) inputting plain text source code and encoding the plain text source code into encoded text to produce a protected code;

(b) running the protected code by reassembling and executing the protected code by a traffic controller code, deriving one or more attributes of the running protected code, and adding the one or more attributes of the running protected code to obfuscated computer-executable source code;

(c) deriving at least one expected attribute of the protected code, wherein said at least one expected attribute comprises an expected number of characters in the protected code when the protected code is obfuscated, and adding the at least one expected attribute of the protected code to the obfuscated computer-executable source code;

(d) using a lubricating code to determine whether the one or more attributes of the running protected code correspond to said at least one expected attribute, wherein said lubricating code is in a form of lubricating code module and comprises a record of one or more derived attributes of running the obfuscated computer-executable source code and is capable of processing all the values that are needed to unlock the rest of the obfuscated computer-executable source code so that the obfuscated computer-executable source code completes execution successfully responsive to no compromise of the obfuscated computer-executable source code is detected; and (e) out-putting the obfuscated computer-executable source code comprising the lubricating code, the traffic controller code, the one or more attributes of the running protected code, and the at least one expected attribute wherein the obfuscated computer-executable source code cannot be readily modified thereby protecting various source codes that are used and written in programming languages against hacking, malicious intent and other intrusions;

wherein the traffic controller code stops an execution of the protected code responsive to the lubricating code determines that said one or more attributes of the running protected code do not correspond to said at least one expected attribute of the protected code.

6. The method of claim 5, wherein the obfuscated computer-executable source code is written in programming language selected from the group consisting of shell, perl, python, php, ruby, Rcode, powershell, and javascript.

7. The method of claim 5, wherein the obfuscated computer-executable source code is executable by an interpreter for a programming language in which the interpreter is written.

8. The method of claim 7, wherein the programming language is selected from the group consisting of shell, perl, python, php, ruby, Rcode, powershell, and javascript.

9. The method of claim 5, wherein the one or more derived attributes of the running protected code comprise a checksum value and a number of characters in the protected code.

10. The method of claim 5, wherein when the obfuscated computer-executable source code directs that the traffic controller code stops the execution of the protected code, a user of the obfuscated computer-executable source code is notified.

11. The method of claim 5, wherein the method is implemented by a computing device programmed to perform the method.

12. A computer for protecting computer-executable source code against hacking, malicious attack and other intrusions, the computer comprising non-transitory media storing obfuscated computer-executable source code and a processor configured to execute the obfuscated computer-executable source code which self-reads itself to protect various source codes, the obfuscated computer-executable source code capable of running on the computer by an interpreter and built from components comprising:

(a) lubricating code capable of comparing one or more derived attributes of the running obfuscated-executable source code with at least one expected attribute of the obfuscated computer-executable source code to determine whether anyone has attempted to tamper with the obfuscated computer-executable source code;

(b) a protected code comprising plain text computer-executable code for which a portion of its characters have been reassigned different characters;

(c) a traffic controller code comprising obfuscated code that reassembles and directs an execution of the protected code according to direction from the lubricating code; and (d) a checksum value and expected number of characters in the obfuscated computer-executable source code comprising values stored after a delimiter that informs the obfuscated computer-executable source code where to look for said values the obfuscated computer-executable source code needs to perform validations;

wherein the traffic controller code is capable of stopping execution of the protected code according to the checksum value and the number of characters; and wherein the traffic controller code controls the execution of the protected code based on the comparison by the lubricating code.

13. The computer of claim 12, wherein the obfuscated computer-executable source code is written in the programming language selected from the group consisting of shell, perl, python, php, ruby, Rcode, powershell, and javascript.

14. The computer of claim 12, wherein the obfuscated computer-executable source code is executable by the interpreter for a programming language in which the interpreter is written.

15. The computer of claim 12, wherein the obfuscated computer-executable source code is executable by the interpreter for the programming language selected from the group consisting of shell, perl, python, php, ruby, Rcode, powershell, and javascript.

16. The computer of claim 12, wherein the checksum value and the number of characters are derived attributes of the running obfuscated computer-executable source code.

17. The computer of claim 12, wherein the checksum value and the number of characters are compared to said at least one expected attribute of the running obfuscated computer-executable source code wherein if the number of characters does not match said at least one expected attribute then the running obfuscated computer-executable source code directs that the traffic controller code stops the execution of the protected code.

18. The computer of claim 12, wherein the running obfuscated computer-executable source code directs that, if the traffic controller code stops the execution of the protected code, a user of the obfuscated computer-executable source code is notified.

* * * * *